S. H. GALLAGHER.
TANK LEVEL SIGNAL.
APPLICATION FILED APR. 17, 1911.

1,012,624.

Patented Dec. 26, 1911.

WITNESSES:
C. F. Phillips
Eleonora Domser

INVENTOR.
Stephen H. Gallagher.
BY Harry D. Wallace
ATTORNEY.

COLUMBIA PLANOGRAPH CO., WASHINGTON, D. C.

UNITED STATES PATENT OFFICE.

STEPHEN H. GALLAGHER, OF CARTHAGE, NEW YORK.

TANK-LEVEL SIGNAL.

1,012,624.   Specification of Letters Patent.   Patented Dec. 26, 1911.

Application filed April 17, 1911. Serial No. 621,516.

*To all whom it may concern:*

Be it known that I, STEPHEN H. GALLAGHER, a citizen of the United States, residing at Carthage, in the county of Jefferson and State of New York, have invented certain new and useful Improvements in Tank-Level Signals, of which the following is a specification.

This invention relates to improvements in tank level signals, designed for use in connection with gasolene and other tanks, and has for its object to provide a novel, simple, convenient and effective signal of the class, which is capable of being attached to a tank, such as employed for carrying oil, water or other liquid, for indicating a predetermined level or quantity of the liquid contained in the tank.

A particular object is to provide an electric signal in combination with a float for controlling the same, which will give an instant signal or warning when the contents of a tank or like receptacle, has been drawn off, or wasted, to a certain extent and requires replenishing or refilling. And a further object is to provide an automatic signal actuating mechanism which is durable and reliable, and which require little attention or care after it has once been installed.

The features and parts of the invention will be understood from the detail description which follows, and by reference to the accompanying drawing, which forms a part of this specification, and in which—

Figure 1:
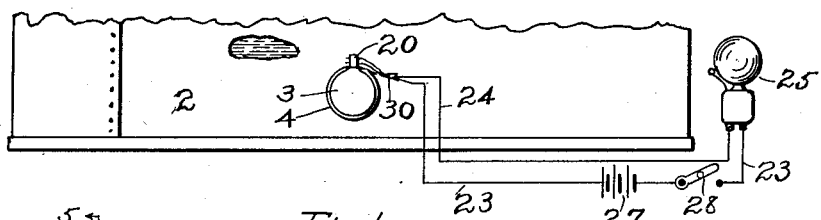
Figure 2:
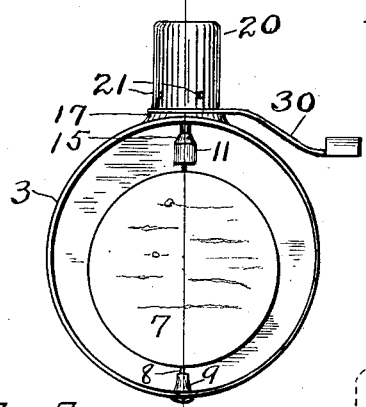
Figure 3:
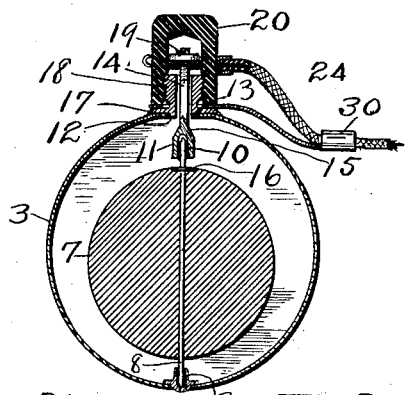
Figure 4:
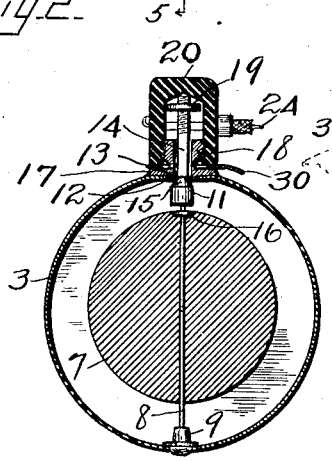
Figures 5, 7:
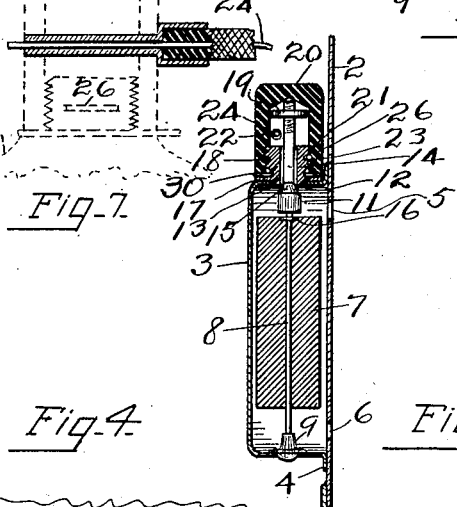
Figure 6:
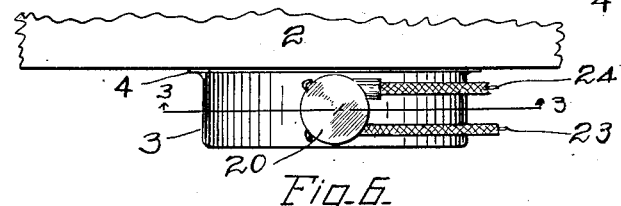

Figure 1 is an elevational view of a tank having my improvement attached. Fig. 2 is a rear-side view of the signal actuating parts. Fig. 3 is an enlarged vertical longitudinal section, taken on line 3—3 of Fig. 6; showing the float in position for closing the electric circuit. Fig. 4 is a similar sectional view; showing the float in position for breaking the electric circuit. Fig. 5 is a central vertical section, on line 5—5 of Fig. 2. Fig. 6 is a top plan view of the signal actuator mounted on a tank. Fig. 7 is a detail view; showing the arrangement of one of the circuit wires.

Similar characters of reference are assigned to corresponding parts throughout the several views.

In the drawing, 2 represents a tank, such as employed for carrying a supply of fuel oil, as gasolene, petroleum, or kerosene, for operating motor boats, automobiles, or other apparatus, which may be constructed in any suitable manner.

Practically all gas or internal combustion engines are supplied with fuel oil, which is carried in tanks. Heretofore, the operators of such engines have been at a loss to know the exact condition of the supply of the fuel in the tanks, after the engines have been operated for a time, unless, from time to time, they open the tanks and gage the contents, or else equip the tanks with the well-known water-gages, for indicating the level of the oil in the tanks. It often happens that the engineer is unable, for one reason or another, to note the true condition of the supply of oil in the tank, until he unexepectedly finds that his fuel is exhausted, and he has no means at hand for renewing the supply. The present invention is intended to remedy these defects and troubles, and to this end I provide a signal or enunciator, preferably audible, such as an electric bell, for indicating that a certain predetermined level or quantity of the liquid fuel remains in the supply tank, after the major portion of the contents have been drawn off, or used.

The various features and parts of my improvement will now be described:

3 represents a hollow body or casing, preferably made of metal, cylindrical in form, and having its rear side open, and its rear circular edge slightly expanded to form a narrow flange 4, which contacts with or bears against the side of the tank, to which it may be permanently secured by means of solder, or otherwise, to render the joint liquid tight.

5 and 6 represent small perforations in the wall of the tank, through which the oil or liquid may flow into and from the casing 3, whereby the level of the oil will be the same in the casing as it is in the tank.

7 represents a float, preferably a body of cork, or like light and buoyant material, which is pivotally mounted inside the casing 3, by means of a rod 8, the lower end of which is loosely journaled in a socket 9 made rigid to the lower inner side of the casing, the upper end of said rod being loosely disposed in a socket 10 of a vertically reciprocating valve 11, which passes upwardly through an opening 12 in the casing. The opening 12 of the casing is bushed by a part 13, which is bored out to receive the stem 14 of the valve, and the valve is provided with the usual cone 15, which seats in the lower end of the bushing 13, when the valve is raised by the float and rod 8. The rod 8 is provided with a flange 16 near its upper end to prevent the float from moving vertically thereon. The bushing 13 has a flange 17 which rests upon the top side of the casing 3, and above the flange 17 is a threaded hub 18, through which the stem 14 of the valve extends, and the free end of the stem 14 is fitted with a circular contact part 19.

20 represents a hollow screw cap, preferably made of hard rubber, but may be made of fiber or other suitable insulating material, which may be applied to the hub 18 for protecting and concealing the parts which project through the casing 3. The cap 20 is perforated at 21 and 22 to receive electric circuit wires 23 and 24, for operating an electric bell 25, which may be of the usual construction, and may be disposed in any convenient position relatively to the tank. The wire 23 after passing through one side of the cap 20, lies in a horizontal slot 26 formed in the side of the hub 18, in which it fits snugly enough for an electric contact, and its free end then extends through the opposite side of the cap, and may be bent or upset for preventing its accidental withdrawal. The wire 24 passes clear through the cap 20 and is positioned between the contact flange 19 and the top of the hub 18, at one side and free from the stem of the valve. The arrangement of the float and the valve is such that, when the liquid enters the casing 3 by flowing through the perforations 5 and 6, it lifts the float, and the rod 8 forces the valve and its stem upwardly and holds the contact part 19 in its highest position, away from the wire 24, as shown in Figs. 4 and 5.

To give an electric signal or warning, for indicating the condition of the level of the oil in the tank, as well as, in the casing 3, the liquid in the tank must be drawn off until its level falls approximately to the lowermost perforation 6, which will allow the float to descend from the position shown in Figs. 4 and 5, to that shown in Fig. 3. The receding of the liquid and the descending of the float, as described, will permit the gravitation of the valve and its stem, so as to bring the contact 19 down upon the wire 24, for completing or closing the electric circuit and ringing the bell. When the part 19 contacts with the wire 24, the electric circuit, supplied by a battery 27, may be traced as follows: From the battery, through wire 23, hub 18, valve stem 14, contact part 19, wire 24, the bell 25, a switch 28, and wire 23 to the battery. The sounding of the bell will warn the engineer that the supply of fuel-oil carried by the tank 2 has been used or wasted to an extent which requires replenishing.

In practice the signal actuator, comprising the casing 3 and related parts, is usually applied to the tank, at a convenient point, some little distance above the bottom, so that the signal may be given by the gravitation of the float, before the supply is entirely exhausted. For example, if a tank carries thirty gallons of oil, the casing 3 of the actuator, is usually placed at a point where the device will indicate that there are still about ten gallons of fuel in the tank, at the time the alarm is sounded, and the engineer may then make arrangements for obtaining a fresh supply of oil. The wires 23 and 24 are chiefly supported by the insulating cap 20, but to further assist in holding the wires in place, a holder 30 is provided, which consists of a strip of metal, perforated at one end to pass over the hub 18, and is then held in place by the cap 20. The opposite end of the holder 30 is arranged to be folded over the insulated wires, as shown in Fig. 3.

It is obvious that an electric lamp may be substituted in place of the bell 25, for giving the warning that the level of the liquid in the tank has reached the danger point, and that some changes or modifications may be made in the parts and in the arrangement thereof, within the scope defined by the appended claims, without departing from the spirit of my invention.

What I claim as new and desire to secure by Letters Patent, is—

1. In combination, a tank for holding liquid having spaced openings for the ebb and flow of the liquid, a casing secured to the tank adapted to receive and discharge liquid through said openings, an electric circuit for operating a bell connected to said casing, a float in said casing adapted to be reciprocated by the change of level of the liquid in said casing, a valve carried by said float adapted to prevent the escape of the liquid from the casing, and a contact carried by the stem of the valve adapted to effect the opening and closing of said electric circuit.

2. The combination with a tank for containing liquid, of a casing secured to the outside of the tank and adapted to receive liquid from the tank, wires forming an electric signal circuit connected to the casing, a float pivoted in the casing, adapted to be raised by the liquid flowing into the casing, for normally holding said electric signal circuit open, the said float adapted to be lowered by gravity by the falling of the level of the liquid in the tank, for closing the electric circuit and sounding an alarm, and a reciprocating valve having a stem actuated by the float adapted for effecting the opening and closing of the electric signal circuit.

3. The combination with a tank for containing liquid, of a cylindrical casing capable of being mounted on the outside of the tank, means for the passage of the liquid from the tank into the casing and vice versa, a float in the casing adapted to move vertically by the rise and fall of the level of the liquid in the tank, an electric signal circuit comprising a pair of wires connected to parts carried by said casing, a bushing piercing the top of the casing, a valve disposed in said bushing having a stem fitted with a contact, the said valve adapted to be lifted and held in closed position by the raising of said float for holding said contact away from one of said wires, said valve adapted to gravitate with the said float while the liquid in the tank is being drawn off to a certain level, and a bell adapted to be sounded by the closing of said circuit for indicating that the liquid in the tank and casing has fallen to a predetermined level.

4. The combination with a tank for containing liquid, of a hollow casing capable of being connected to the tank, means for the passage of liquid from the tank into said casing and vice versa, a float in the said casing adapted to be moved upwardly by the flow of liquid from the tank into said casing, and to gravitate to its lowest position by the ebb of the liquid from the casing into the tank, a bushing piercing the top of the casing, a valve connected to the float adapted to reciprocate in said bushing to the extent of the movements of said float, a signal bell, a wire connecting said bell with said bushing, an insulating cap carried by said bushing, a wire supported by said cap and connecting with said bell, the said wire adapted to contact with the stem of the said valve, for closing the electric circuit and ringing said bell, when the liquid in the tank and casing is drawn off to a predetermined level.

5. The combination with a tank for containing fuel-oil, and an electric bell, of a casing capable of being attached to the outside of the tank, and supplied with oil from the tank, a float in the casing, a rod supporting the float, a valve disposed above the float and connecting with said rod, the stem of the valve passing through an opening in the top of the casing, the valve adapted to prevent the escape of the oil through the said opening, a pair of wires connecting the bell with parts carried by the casing, the arrangement of the wires being such that, when the valve is closed by the raising of the float, the signal circuit is held normally open, and when the oil has been drawn off from the tank to a predetermined level, the float gravitating with the receding oil, allows the valve to move downwardly for effecting the closing of the circuit and ringing the bell.

6. The combination with an oil tank, and an electric bell, connecting with a pair of circuit wires, of a signal actuator comprising a hollow body rigidly attached to the tank, adapted to receive oil from the tank and to discharge the same into the tank by gravity, a float pivotally disposed in the said body, adapted to rise and fall with the liquid in the body and tank, a bushing piercing the top of the body having a threaded hub, to which one of the circuit wires connects, a cap of insulating material, adapted to be screwed on to the hub of the bushing, the cap arranged to support the second circuit wire above and clear of the bushing, a valve in the body connecting, and adapted for vertical movements with the float, the valve having a stem piercing the bushing, a contact part mounted on the free end of the valve stem, adapted for engaging the second circuit wire when the float and valve descend with the receding oil, for closing the electric circuit and ringing the bell.

7. A signal apparatus, comprising a hollow body capable of being attached to a tank, and adapted to receive liquid from the tank, and to discharge the same back into the tank, a float disposed in the said body, a valve in the said body above the float, the said valve adapted to be forced upwardly by the float when the latter is raised by the liquid flowing into said body, the said valve employed for closing an opening in the top of the body, through which the stem of the valve protrudes, a bushing fitted in the opening in the body, an electric wire constantly contacting with said bushing, a cap for inclosing said bushing, an electric wire piercing said cap and arranged to contact with the stem of the valve when the level of the liquid in the said body falls a predetermined distance, for closing an electric circuit through said wires, and a bell, connected to said wires, adapted to ring when the circuit is closed, substantially as described.

8. In combination, a tank for containing liquid, a casing connected to the outside of the tank capable of being supplied with liquid from the tank, an electric signal circuit connected to said casing, a float pivotally disposed in the casing, adapted to be raised and lowered by the rise and fall of the liquid in the casing, and a valve actuated by said float adapted for preventing the escape of the liquid from the top of the casing, said valve having a stem fitted with a contact adapted for opening and closing said signal circuit.

In testimony whereof I affix my signature in presence of two witnesses.

STEPHEN H. GALLAGHER.

Witnesses:
F. E. SCHWARTZ,
W. S. SCHWARTZ.